(12) United States Patent
Govindan et al.

(10) Patent No.: US 12,476,910 B1
(45) Date of Patent: Nov. 18, 2025

(54) OPTIMIZED MVPN ROUTE EXCHANGE IN SD-WAN ENVIRONMENTS

(71) Applicant: Cisco Technology, Inc., San Jose, CA (US)

(72) Inventors: Vengada Prasad Govindan, Chennai (IN); Manikandan Panchanathan, Navalur (IN); Ravi Kiran Chintallapudi, Pleasanton, CA (US); Alfred C. Lindem, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/656,098

(22) Filed: May 6, 2024

Related U.S. Application Data

(63) Continuation of application No. 17/377,607, filed on Jul. 16, 2021, now Pat. No. 11,991,076.

(60) Provisional application No. 63/086,481, filed on Oct. 1, 2020.

(51) Int. Cl.
*H04L 45/02* (2022.01)
*H04L 12/18* (2006.01)
*H04L 45/58* (2022.01)

(52) U.S. Cl.
CPC .............. *H04L 45/58* (2013.01); *H04L 12/18* (2013.01)

(58) Field of Classification Search
CPC ....... H04L 12/185; H04L 12/18; H04L 45/16; H04L 45/48; H04L 45/58
See application file for complete search history.

(56) References Cited

U.S. PATENT DOCUMENTS

| | | | |
|---|---|---|---|
| 6,760,777 B1 | 7/2004 | Agarwal et al. | |
| 9,467,478 B1 | 10/2016 | Khan et al. | |
| 9,998,291 B1 | 6/2018 | Khan et al. | |
| 10,382,217 B1 | 8/2019 | Kebler et al. | |
| 2002/0107893 A1 | 8/2002 | Ohkouchi et al. | |
| 2003/0235155 A1 | 12/2003 | Boivie et al. | |
| 2017/0346645 A1 | 11/2017 | Kotalwar et al. | |
| 2019/0081996 A1* | 3/2019 | Kebler | H04L 45/033 |
| 2019/0280974 A1 | 9/2019 | Jeng et al. | |
| 2020/0177503 A1 | 6/2020 | Hooda et al. | |
| 2022/0272028 A1* | 8/2022 | Xie | H04L 45/24 |

FOREIGN PATENT DOCUMENTS

WO 2018067890 A1 4/2018

* cited by examiner

*Primary Examiner* — Mansour Oveissi
(74) *Attorney, Agent, or Firm* — Baker Botts L.L.P.

(57) ABSTRACT

According to certain embodiments, a router comprises one or more processors and one or more computer-readable non-transitory storage media. The one or more computer-readable non-transitory storage media comprise instructions that, when executed by the one or more processors, cause one or more components of the router to perform operations comprising determining an occurrence of one or more network events associated with a multicast service, generating route exchange information associated with the multicast service locally by the router based on the one or more network events, and using the route exchange information locally to configure the router.

20 Claims, 8 Drawing Sheets

OPTIMIZED MVPN ROUTE EXCHANGE IN SD-WAN ENVIRONMENTS

CROSS-REFERENCE TO RELATED APPLICATIONS

This application is a continuation of U.S. patent application Ser. No. 17/377,607 filed on Jul. 16, 2021, which claims priority to U.S. Provisional Patent Application No. 63/086,481 filed on Oct. 1, 2020, by Vengada Prasad GOVINDAN, et al. and entitled "Optimized MVPN Route Exchange in SD-WAN Environments", which are hereby incorporated by reference in their entireties.

TECHNICAL FIELD

The present disclosure generally relates to computer networks, and more specifically to optimizing multicast techniques in a computer network.

BACKGROUND

Multicast techniques allow for sending data to a group of interested receivers. Multicast techniques may make efficient use of network infrastructure, for example, by requiring the source to send a packet only once, even if the packet needs to be delivered to a large number of receivers. Nodes in the network, such as switches and routers, may replicate the packet so that the packet reaches each interested receiver.

DESCRIPTION OF EXAMPLE EMBODIMENTS

Overview

Figure 1B:
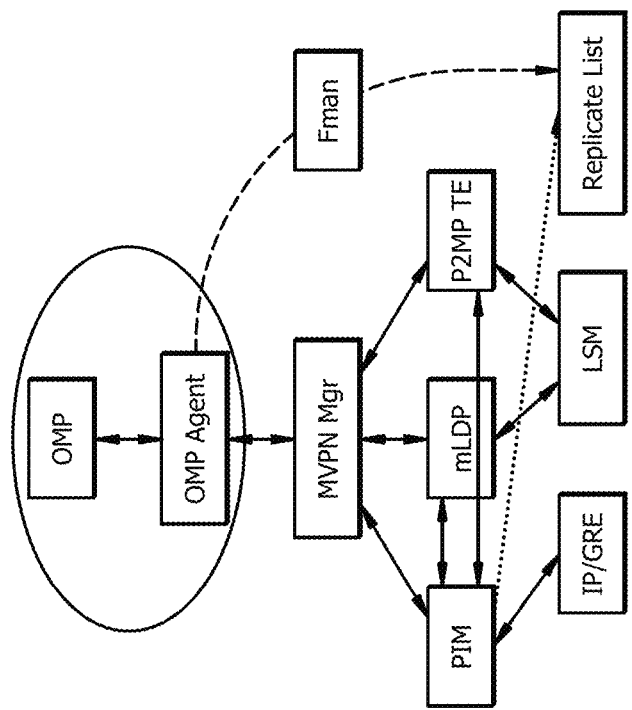
FIG. 1B illustrates an example of a customer edge (cEdge) overlay multicast system, in accordance with certain embodiments.

According to certain embodiments, a router comprises one or more processors and one or more computer-readable non-transitory storage media. The one or more computer-readable non-transitory storage media comprise instructions that, when executed by the one or more processors, cause one or more components of the router to perform operations comprising determining an occurrence of one or more network events associated with a multicast service, generating route exchange information associated with the multicast service locally by the router based on the one or more network events, and using the route exchange information locally to configure the router.

According to certain embodiments, a method for use in a router comprises determining an occurrence of one or more network events associated with a multicast service, generating route exchange information associated with the multicast service locally by the router based on the one or more network events, and using the route exchange information locally to configure the router.

According to certain embodiments, or more computer-readable non-transitory storage media embodying instructions that, when executed by a processor of a router, cause the performance of operations including determining an occurrence of one or more network events associated with a multicast service, generating route exchange information associated with the multicast service locally by the router based on the one or more network events, and using the route exchange information locally to configure the router.

In certain embodiments, a method for optimizing MVPN route exchange in an SD-WAN environment is provided. The method includes dropping, using an Overlay Management Protocol (OMP) component, Selective-Provider Multicast Service Interface (S-PMSI) messages received from an MVPN manager. The method also includes communicating the state of the S-PMSI to the OMP component and generating, by the OMP component, Leaf Auto-Discovery (Leaf A-D) routes based on received (S, G) and/or (*, G) joins. The method further includes generating, by the OMP component, Leaf A-D removal in the event that a router withdraws from the (S, G) and/or (*, G).

An SD-WAN environment may perform multicast networking in a "software-defined" manner using one or more nodes called replicator(s). Certain SD-WAN implementations include a route exchange method that is optimized for unique properties. These unique properties include the following: (1) For Ingress Replication, which is used by the underlay of the SD-WAN network, every Last Hop Router (LHR) receives a (unicast) copy of a packet. (2) The replication of packets occurs (largely) at designated nodes' replicators, which provides a significant challenge to the protocol for exchanging route information. With the introduction of the replicator, the multicast flow becomes more complex. Signaling of state (join/leaves) from LHRs are not directly communicated to Rendezvous Points (RPs) or First Hop Routers (FHRs); instead, they pass through the replicator to reach the FHR or the RP. From the perspective of the FHR/RP, the replicator behaves as an LHR. From the perspective of the LHR, the replicator behaves as an FHR/RP. The data plane of the flow may need to be "stitched" in the replicator. The replicator functionality can be co-existent in the same (physical) node behaving as an FHR, RP, LHR, or any combination thereof. Replicators may be daisy-chained or clustered to increase the scale of LHRs. (3)

Immediate switchover to Data Multicast Distribution Tree (MDT) is used. (4) Route exchange between any two nodes occurs through a controller (e.g., vSmart) similar to a Border Gateway Protocol (BGP) route-reflector.

Multicast Virtual Private Network (MVPN), as illustrated in RFC6513/RFC6514, involves traditional provider edges (PEs). This disclosure describes example embodiments that improve the method of state propagation. For example, the Selective Provider Multicast Service Interface (S-PMSI) route and Leaf A-D route messages may not need to be advertised or withdrawn since the information can be deduced from the other messages. In the certain SDWAN implementations, the MVPN functionality is leveraged to provide multicast service to SD-WAN VPNs. Reduction of state related to two routes will therefore increase the scalability factor of the controller (e.g., vSmart) and the replicator. This disclosure outlines the method to deduce these messages, which may reduce the route/message exchange between the entities.

Example Embodiments

Certain embodiments of this disclosure describe systems and methods for optimizing MVPN route exchange in SD-WAN environments. With SD-WAN, OMP is used in lieu of the BGP signaling protocol. The existing BGP MVPN functionality is leveraged to provide SD-WAN MVPN service.

Figure 1A:
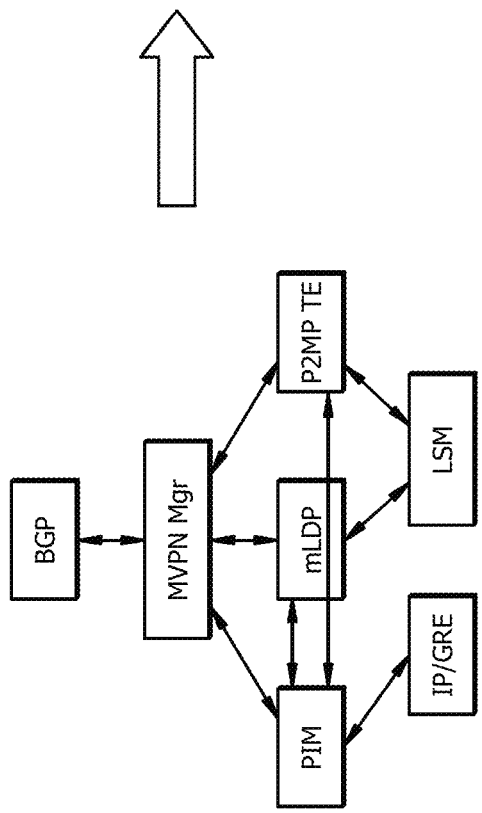
FIG. 1A illustrates an example of a Border Gateway Protocol (BGP) Multicast Virtual Private Network (MVPN), in accordance with certain embodiments.

FIG. 1A illustrates an example BGP MVPN. FIG. 1B illustrates an example in which the BGP architecture of FIG. 1A has been replaced with an OMP architecture comprising a customer edge (cEdge) overlay multicast system. As illustrated in FIG. 1A, an OMP Agent module runs on every router/cEdge to adapt the sequence of events of OMP to the sequence expected by modules like MVPN that have been originally designed for BGP. In certain embodiments, the sequence of operations involving the S-PMSI and Leaf Auto-Discovery (Leaf A-D) is modified as follows: (1) If an S-PMSI route is not required for an SD-WAN environment, S-PMSI messages from an MVPN Manager are dropped by the OMP component (at the FHR/Replicator) and are not sent to other SD-WAN multicast routers. The generation of the S-PMSI triggers the following set of events: (a) The state of the S-PMSI is passed on to the OMP component. The OMP component generates Leaf A-D routes based on received (S, G) and/or (*, G) joins. (b) At the Replicator/FHR/RP, the Leaf A-D routes (e.g., MVPN Route Type 4) are auto-generated based on the incoming (S, G) or (*, G) join (e.g., MVPN Route Types 6/7) messages with the Leaf A-D bit set. Typically, the Type 4 route is sent as a response to the Type 3 route; however, in this instance, the OMP component auto-generates the Type 4 route. (c) Any further (*, G) or (S, G) join messages cause the OMP component to generate the Leaf A-D based on the S-PMSI state. (d) If an LHR withdraws from the (*, G) or (S, G), the Leaf A-D removal is generated by the OMP component. (2) The Leaf A-D join for the (*, *), which is also known as a Partitioned MDT, is based on the advertisement of the BGP A-D route (e.g., MVPN RT-1). (3) The Leaf A-D removal for the (*, *) is based on the withdrawal of the BGP A-D route.

In certain instances, the RP may not have any local receivers. Since the Leaf A-D was neither advertised nor withdrawn from the receiver to the sender, the RP continued to receive traffic. Therefore, special logic is added to the RP and OMP to detect the presence and/or absence of the local receivers associated with the RP. The special logic is further described below with respect to FIG. 6 and FIG. 7, for example.

Certain embodiments may include one or more of the following steps: (1) Last Hop Router (LHR): OMP performs piggybacking of Leaf A-D (MVPN RT-4) with the Leaf A-D flag on MVPN Route Type 7 (S, G) depending on local receivers being present or not. (2) Replicator/RP/FHR: the Leaf A-D is generated (rather than explicitly being received from the LHR). The Leaf A-D generation may be performed using one of the following sequences: (a) If the S-PMSI is received, the state information is cached. Any further (*, G) or (S, G) join is then used to generate the Leaf A-D route in addition to passing on the join to the MVPN Manager. (b) If the join(s) arrive first and the S-PMSI arrives later, the joins are cached, and the Leaf A-D is generated based on the S-PMSI arrival. (3) When the RP no longer has local receivers, the SD-WAN multicast receivers can be pruned from the Partitioned MDT. Examples of steps (1) and (2) are further described below with respect to FIGS. 3-5. Examples of step (3) are further described below with respect to FIGS. 6-7.

Figure 1C:
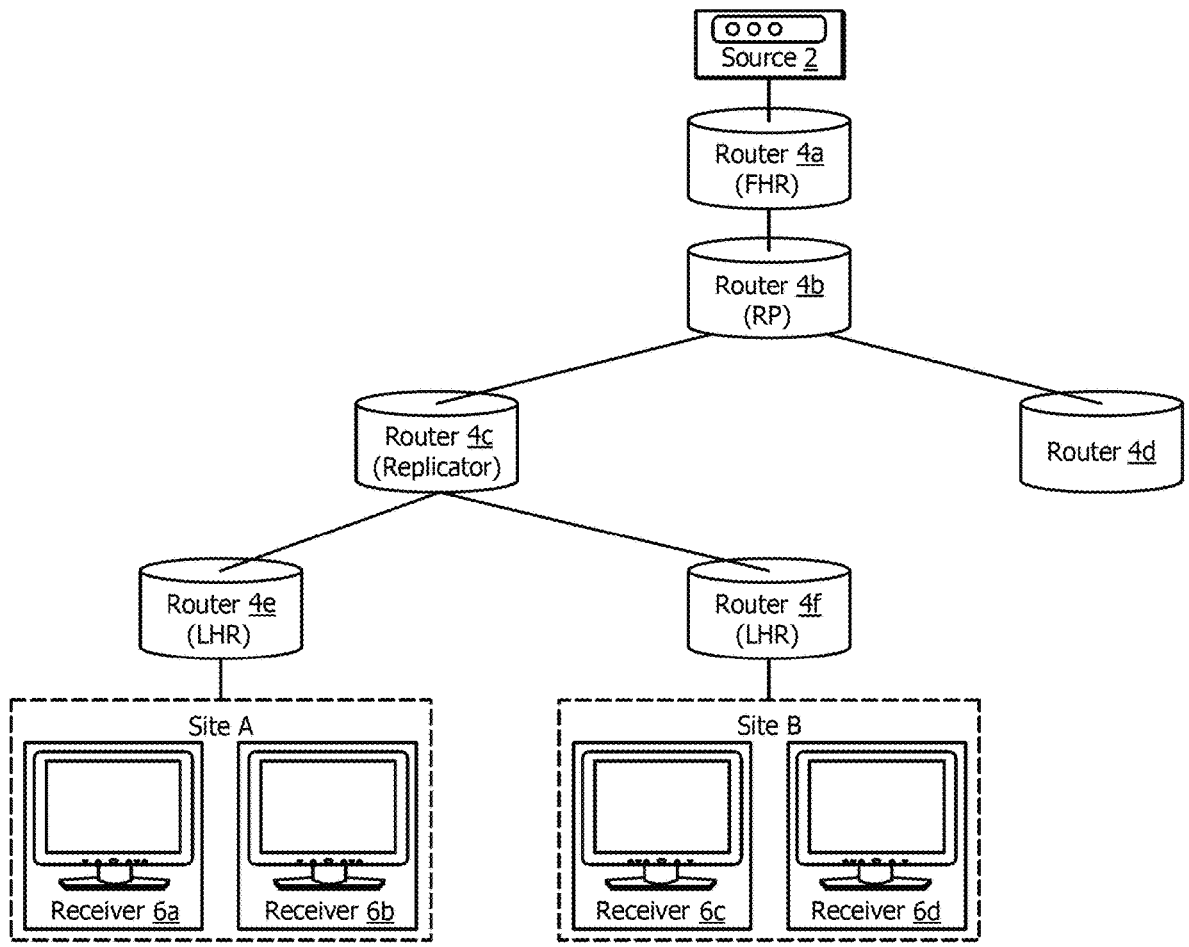
FIG. 1C illustrates an example of a network, in accordance with certain embodiments.

FIG. 1C illustrates an example of a network, such as an SD-WAN. The network may comprise one or more sources 2, a plurality of routers 4, and one or more receivers 6. The physical topology for the SD-WAN is simply a cloud (representing the WAN) with all routers connecting to the cloud. For purposes of example and explanation, FIG. 1C shows certain connections between certain components (such as connections between certain routers 4). However, FIG. 1C does not imply a particular physical topology as the connections may be made via the cloud. In general, the SD-WAN may comprise an underlay network that supports a virtual overlay network. An underlay network may include, for example, all or a portion of: the Internet, one or more Internet Protocol (IP) networks (such as one or more IP Security, IPsec, networks), one or more Multiprotocol Label Switching (MPLS) networks, one or more cellular network(s), and/or other suitable networks. In certain embodiments, the virtual overlay network may comprise data plane connections/tunnels that carry traffic between components of the SD-WAN. As an example, the virtual overlay network may comprise Internet Protocol Security (IPsec) tunnels that carry traffic between components of the SD-WAN. In certain embodiments, the virtual overlay network may carry traffic between a plurality of sites (including, for example, a first site A and a second site B) over the underlay network. Each site may connect to the network via one or more WAN-edge routers. As illustrated, the first site A connects to the network via edge router 4e, and the second site B connects to the network via edge router 4f. In certain embodiments, first site A and second site B may be associated with an organization. As an example, first site A may be a central office of the organization, and site B may be a branch or regional office of the organization. The SD-WAN facilitates communication among receivers 6 in the various offices.

In certain embodiments, a source 2 may originate a multicast stream. As one example, a source 2 could be a video camera that provides video data to be multicast to a plurality of receivers 6a-6d via routers 4. A first router 4a may be configured as an FHR that receives the multicast stream from source 2 and communicates the multicast stream to a second router 4b, which may be configured as an RP. The RP may act as a meeting place for sources 2 and receivers 6 of the multicast stream. For example, the FHR may register a source 2 with the RP such that the source 2 sends its multicast stream to the RP to be forwarded to receivers 6a-6d. In an embodiment, the RP sends the multicast stream to router 4c, which may be configured as a replicator. Router 4c replicates the multicast stream and sends a copy to router 4e and another copy to router 4f. Optionally, router 4d may also be configured as a replicator (as an example, router 4d could be configured as a replicator that sends multicast traffic to another LHR, not shown). Router 4e is configured as an LHR that serves receivers 6a and 6b associated with site A, and router 4f is configured as an LHR that serves receivers 6c and 6d associated with site B. Examples of receivers 6 may include user devices, such as a desktop computer system, a laptop or notebook computer system, an interactive kiosk, a mobile telephone, a personal digital assistant (PDA), a tablet computer system, an augmented/virtual reality device, etc. Additional examples of receivers 6 may include servers, mainframes, data centers, cloud platforms, or any other computer system capable of receiving a multicast stream.

As described above, a replicator receives multicast data and makes a copy of the multicast data for a receiver 6. The replicator can replicate multicast traffic that is rooted anywhere, such as either * root, for example, in the case of a (*, G) stream, or S root, for example, in the case of an (S, G) stream. In both cases, the G represents multiple receivers that want to receive the multicast stream. The S indicates that the multicast stream is to be received from a particular source, such as an IP address of a particular video camera. The * is a wildcard indicating that the multicast stream can be received from any source.

Although this disclosure describes a SD-WAN network in a particular manner, this disclosure contemplates a SD-WAN network in any suitable manner. For example, for simplicity, FIG. 1C shows certain communication paths between routers 4a-4f. Additional communication paths may exist between various routers 4a-4f. Furthermore, in certain embodiments, the network may include other routers 4 (which may be configured as FHRs, RPs, replicators, or LHRs, for example), and one or more of routers 4a-4f may communicate with one or more of the other routers. Additionally, an FHR and an RP may be co-located or non-co-located, and there can be a plurality of FHRs and/or a plurality of RPs. Moreover, the SD-WAN may comprise any other suitable components, such as a controller in a control plane that may provision, maintain, and/or secure the overlay network and/or a manager in a management/orchestration plane.

Figure 2:
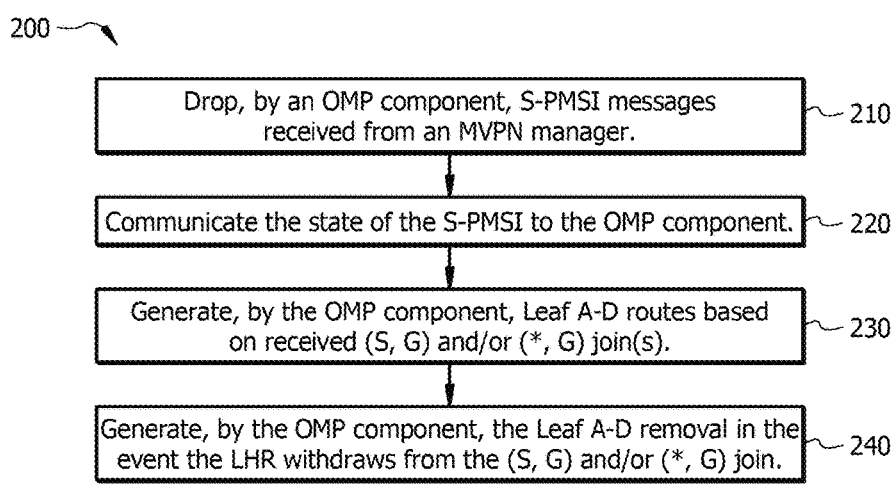
FIG. 2 illustrates an example of a method for optimizing MVPN route exchange in a Software-Defined Wide Area Network (SD-WAN) environment, in accordance with certain embodiments.

FIG. 2 illustrates an example method for optimizing MVPN route exchange in an SD-WAN environment. Method 200 begins at step 210, where an OMP component drops S-PMSI messages received from an MVPN manager. The OMP component may drop the S-PMSI messages in response to determining that the S-PMSI route is not required for the SD-WAN environment. At step 220 of method 200, the state of the S-PMSI is communicated to the OMP component. At step 230 of method 200, the OMP component generates Leaf A-D routes based on received (S, G) and/or (*, G) joins. For example, at the replicator/FHR/RP, the OMP component may auto-generate the Leaf A-D routes (e.g., MVPN route type 4) based on the incoming (S, G) and/or (*, G) join messages with the Leaf A-D bit set. At step 240 of method 200, the OMP component generates the Leaf A-D removal in the event that a router (e.g., an LHR) withdraws from the (S, G) and/or (*, G). Method 200 ends at step 240.

FIGS. 3-8 describe examples of messages that may be generated, communicated, or otherwise used by certain routers, such as an ingress-edge 10, an RP-edge 20, a replicator 30, and/or an egress-edge 40. In certain embodiments the ingress-edge 10, RP-edge 20, replicator 30, and egress-edge 40 may correspond to FHR 4a, RP 4b, replicator 4c, and LHR 4e (or LHR 4f), respectively, described above with respect to FIG. 1C.

Figure 3:
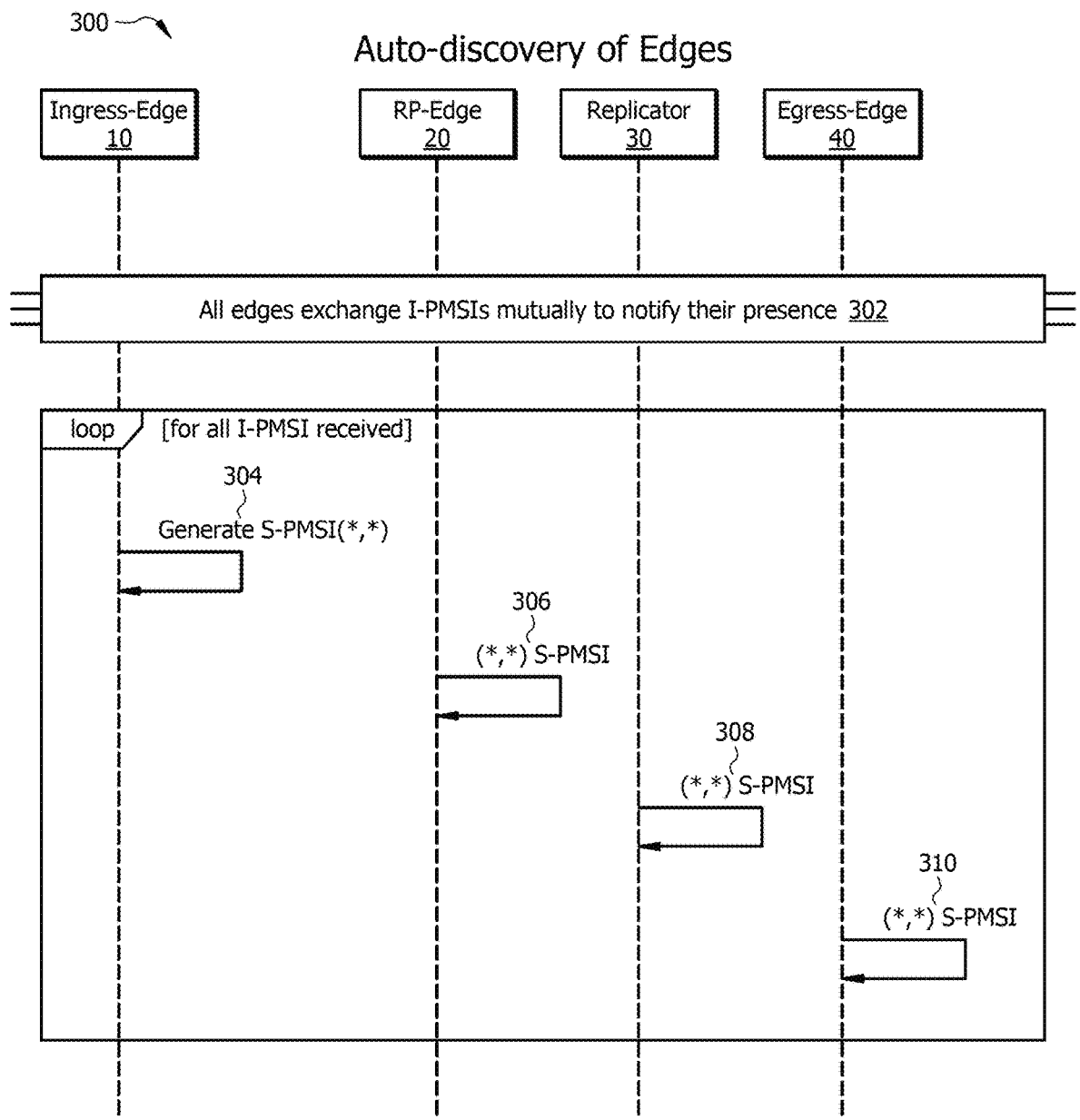
FIG. 3 illustrates an example of a message flow for auto-discovery of edges, in accordance with certain embodiments.

FIG. 3 illustrates an example of a message flow 300 for auto-discovery of edges, in accordance with certain embodiments. At step 302, all edges exchange Inclusive-PMSI (I-PMSIs) mutually to notify of their presence. For each I-PMSI, an S-PMSI (*, *) is generated locally by the ingress-edge 10 (step 304), the RP-edge 20 (step 306), the replicator 30 (step 308), and the egress-edge 40 (step 310), respectively.

Figure 4:
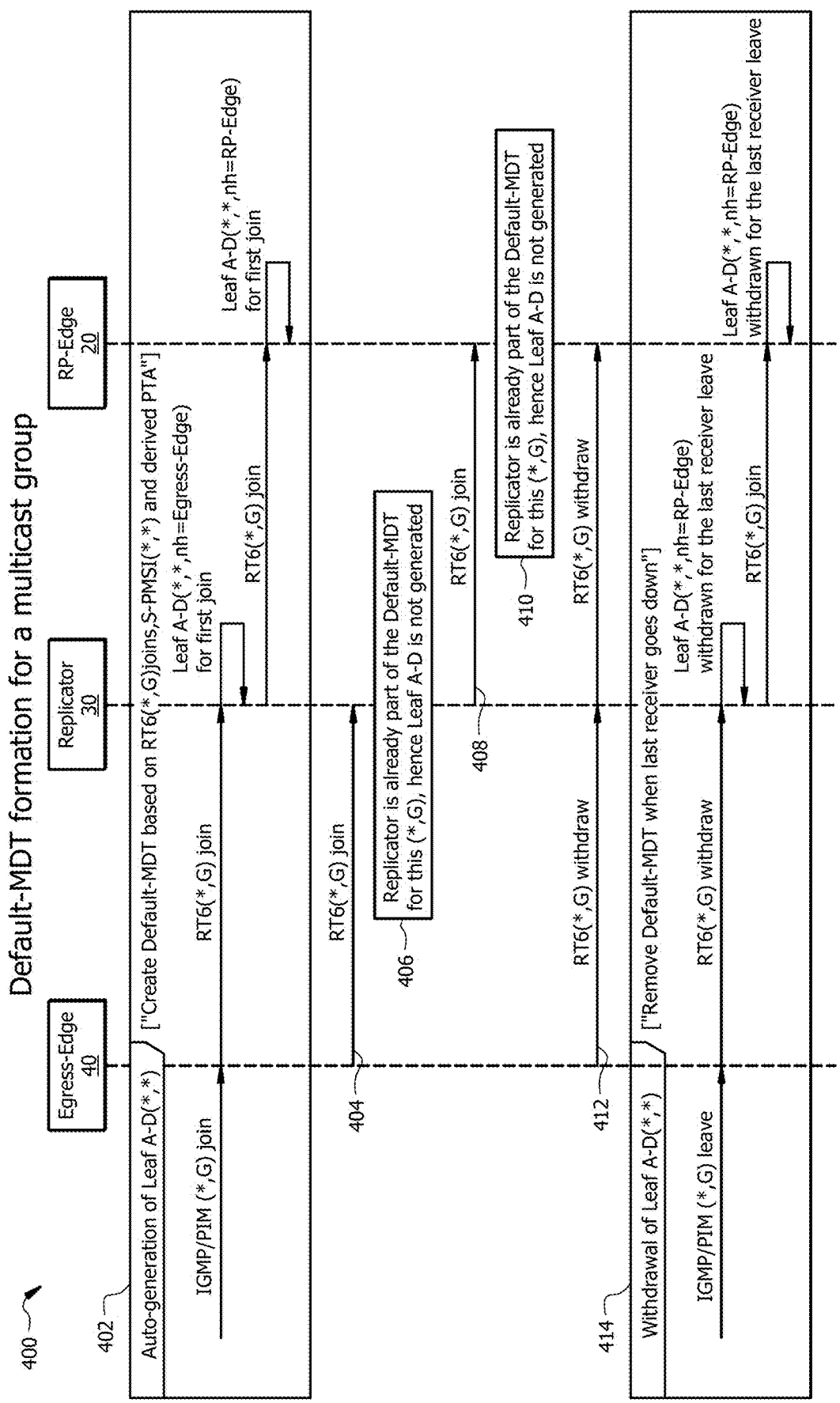
FIG. 4 illustrates an example of a message flow for Default Multicast Distribution Tree (MDT) formation for a multicast group, in accordance with certain embodiments.

FIG. 4 illustrates an example of a message flow 400 for Default Multicast Distribution Tree (MDT) formation for a multicast group, in accordance with certain embodiments. The Default-MDT may be created based on Route-type 6, RT6, (*, G) joins, S-PMSI (*, *), and derived PMSI Tunnel Attribute (PTA). Message flow 400 begins with an auto-generation of Leaf A-D (*, *) message sequence 402. As an example, egress-edge 40 may receive an Internet Group Management Protocol/Protocol Independent Multicast, IGMP/PIM, (*, G) join. For example, egress-edge 40 may receive the message from a receiver 6 served by egress-edge 40. In response to receiving the message, egress-edge 40 may communicate an RT6 (*, G) join to replicator 30. For a first join (a join received when replicator 30 is not already included in the Default-MDT), replicator 30 may generate a Leaf A-D join for itself, such as Leaf A-D (*, *, next hop (nh)=Egress-Edge 40) join. Replicator 30 may communicate an RT6 (*, G) join to RP-edge 20. For a first join (a join received when RP-edge 20 is not already included in the Default-MDT), RP-edge 20 may generate a Leaf A-D join for itself, such as Leaf A-D (*, *, nh=RP-Edge 20) join.

Message flow 400 proceeds to message 404, where egress-edge 40 sends an RT6 (*, G) join to replicator 30. At step 406, replicator 30 determines that it is already part of the Default-MDT for this (*, G). Thus, replicator 30 does not generate a Leaf A-D for itself. Message flow 400 proceeds to message 408, where replicator 30 sends an RT6 (*, G) join to RP-edge 20. At step 410, RP-edge 20 determines that replicator 30 is already part of the Default-MDT for this (*, G) and, thus, RP-edge 20 does not generate a Leaf A-D for itself.

Message flow 400 proceeds with messages 412, where egress-edge 40 sends an RT6 (*, G) withdraw to replicator 30, and replicator 30 sends the RT6 (*, G) withdraw to RP-edge 20. Message flow 400 may then proceed with a withdrawal of Leaf A-D (*, *) message sequence 414. For example, the Default-MDT may be removed when the last receiver goes down. Message sequence 414 begins with egress-edge 40 receiving an IGMP/PIM (*, G) leave message. For example, egress-edge 40 may receive the message from a receiver 6 served by egress-edge 40. In response to receiving the message, egress-edge 40 may communicate an RT6 (*, G) withdraw to replicator 30. For the last receiver to leave, replicator 30 may generate a Leaf A-D withdraw for itself, such as a Leaf A-D (*, *, nh=RP-edge 20) withdraw. Replicator 30 may communicate an RT6 (*, G) withdraw to RP-edge 20. For the last receiver to leave, RP-edge 20 may generate a Leaf A-D withdraw for itself, such as a Leaf A-D (*, *, nh=RP-edge 20) withdraw.

Figure 5:
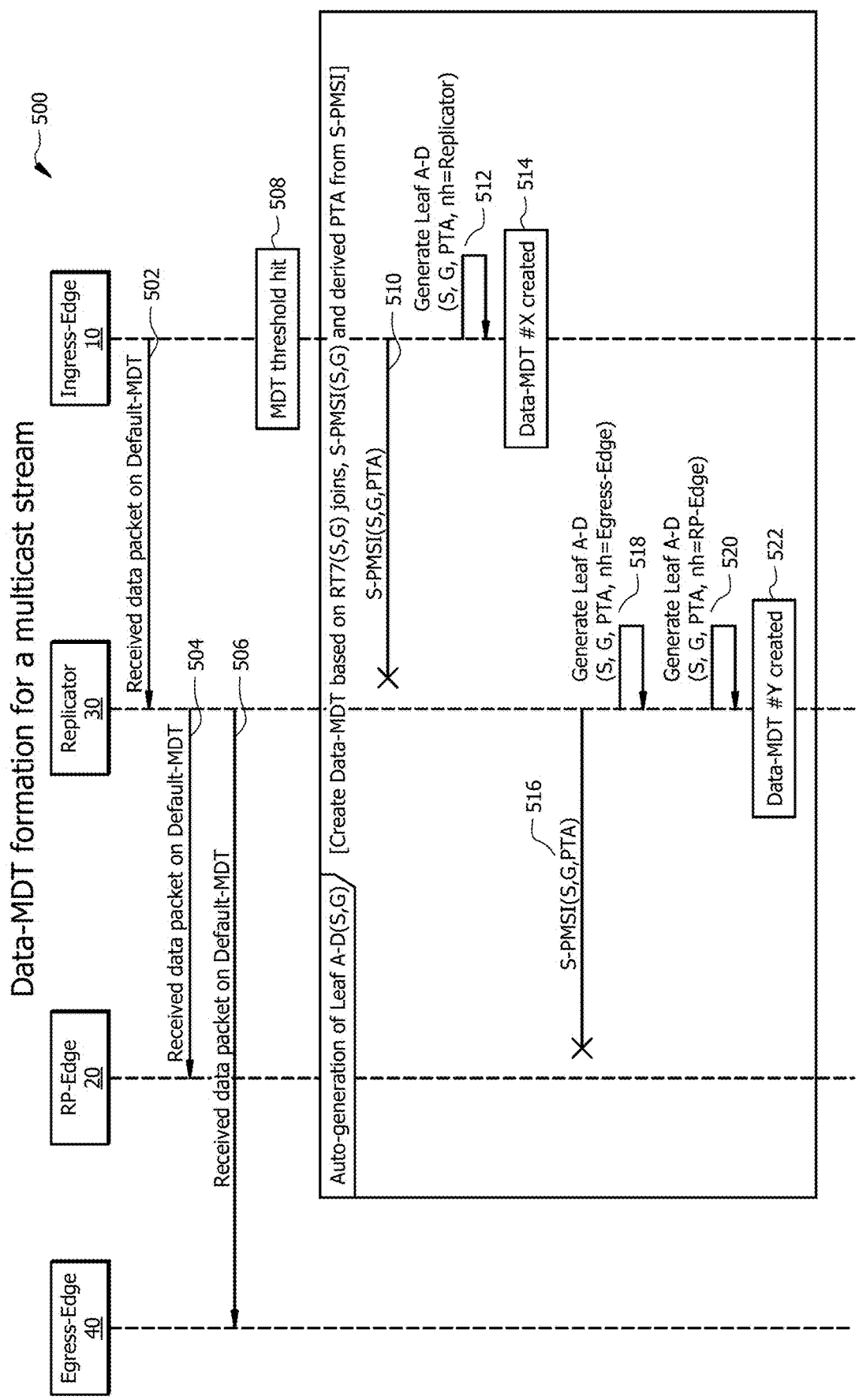
FIG. 5 illustrates an example of a message flow for a Data-MDT formation for a multicast stream, in accordance with certain embodiments.

FIG. 5 illustrates an example of a message flow 500 for a Data-MDT formation for a multicast stream, in accordance with certain embodiments. Message flow 500 begins at message 502 with ingress-edge 10 sending replicator 30 a received data packet on the Default-MDT. Replicator 30 sends the received data packet on the Default-MDT to RP-edge 20 (as shown in message 504) and to egress-edge 40 (as shown in message 506). At step 508, ingress-edge 10 determines that the Default-MDT threshold has been hit. Message flow 500 may proceed with a sequence of messages, such as messages 510-522, for auto-generation of Leaf A-D (S, G). For example, a Data-MDT may be created based on Route-type 7, RT7, (S, G) joins, S-PMSI (S,G), and derived PTA from S-PMSI. FIG. 5 illustrates an "X" at the end of message 510 to indicate that the S-PMSI 510 is not sent from the ingress-edge 10 to replicator 30 (or to any other node). At message 512, ingress-edge 10 generates a Leaf A-D (S, G, PTA, nh=Replicator 30) for itself. At step 514, ingress-edge 10 creates a Data-MDT #X. FIG. 5 illustrates an X at the end of message 516 to indicate that that the S-PMSI (S, G, PTA) is not sent from replicator 30 to RP-edge 20 (or to any other node). At message 518, replicator 30 generates a Leaf A-D (S, G, PTA, nh=Egress-Edge 40) for itself. At message 520, replicator 30 generates a Leaf A-D (S, G, PTA, nh=RP-Edge 20) for itself. At step 522, replicator 30 creates a Data-MDT #Y.

Figure 6:
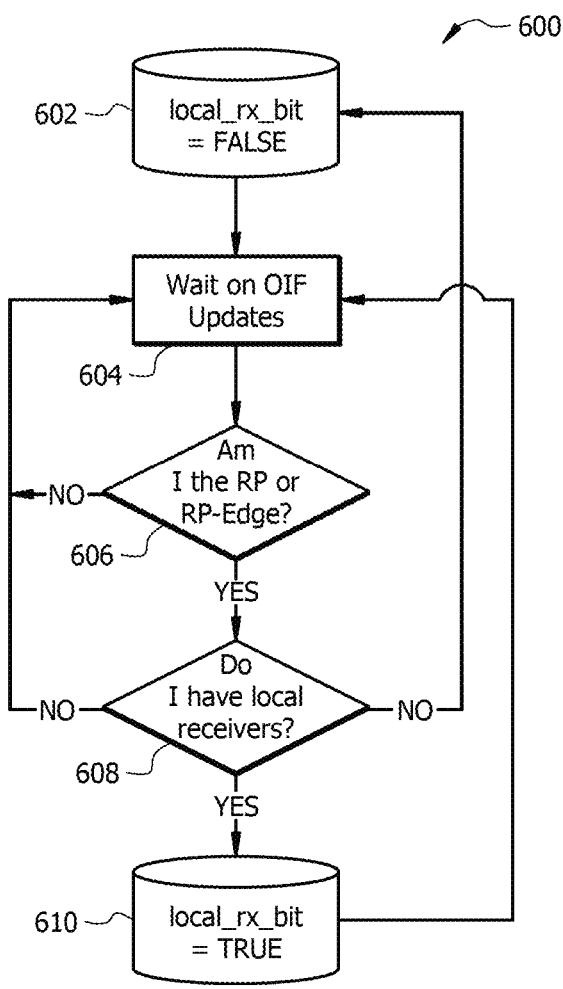
FIG. 6 illustrates an example of a flow chart for to detecting the presence or absence of local receivers associated with an rendezvous point (RP), in accordance with certain embodiments.

FIG. 6 illustrates an example of a method 600 for detecting the presence or absence of local receivers associated with an RP or RP-Edge, in accordance with certain embodiments. In certain embodiments, a local receiver may refer to a receiver 6 that connects directly or on the service-side PIM network, and an RP-Edge may refer to a router 4 located at the edge of the SD-WAN and configured to host an RP in it or in its service-side network.

In certain embodiments, a shortest path tree (SPT) associated with multicast traffic need not include an RP unless that RP has receivers associated with it. Otherwise, if the SPT were to include an RP without any receivers associated with it, the RP would needlessly pull multicast traffic only to drop the multicast traffic due to the absence of receivers. Certain embodiments may configure a parameter, such as local_rx_bit, to indicate whether the RP needs to obtain the multicast traffic. If the RP does not have any receivers associated with it, local_rx_bit may be set to "false" to indicate that the RP does not need to obtain the multicast traffic, in which case the RP can be pruned off of the SPT. If the RP has one or more receivers associated with it, local_rx_bit may be set to "true" to indicate that the RP should be included in the SPT and should therefore receive the multicast traffic, which the RP may then send toward its receivers. Any suitable values may be used to represent true or false settings, such as "1," "true," "yes," or other suitable value for true, and "0," "false," "no," or other suitable value for false.

Certain embodiments may determine whether the RP has any receivers associated with it based at least in part on the status of an Output Interface (OIF) of the RP or RP-Edge that replicates multicast traffic. As an example, the RP determines that there is at least one receiver connected directly or indirectly to the RP (or to the edge hosting the RP) based on determining that the RP or RP-Edge includes at least one OIF currently programmed to replicate multicast traffic. In this case, the local_rx_bit is set to true. The RP determines that there is not any receiver connected directly or indirectly to the RP (or to the edge hosting the RP) based on determining that the RP or RP-Edge does not include any OIF currently programmed to replicate multicast traffic. In this case, the local_rx_bit may be set to false.

The SPT may be updated in response to a change in the value of the local_rx_bit. When the local_rx_bit changes from false to true, the RP may be added to the SPT. When the local_rx_bit changes from true to false, the RP may be pruned from the SPT. For example, suppose the RP does not have any local receivers such that the local_rx_bit is set to false. If a first local receiver is added, the local_rx_bit is changed to true, and the RP is added to the SPT. If second, third, fourth, . . . $n^{th}$ receivers are added, the local_rx_bit remains set to true and the RP remains in the SPT. As long as RP has at least one receiver associated with it, other receivers may be added to and/or removed from the RP without changing the local_rx_bit. Once the last receiver is withdrawn from associated with the RP, the local_rx_bit changes from true to false, and the RP is pruned from the SPT. In this manner, the RP can receive the multicast traffic when there are receivers associated with it, however, the RP need not pull the multicast traffic only to drop the multicast traffic when there are not any receivers associated with the RP.

With respect to the steps of FIG. 6, method 600 begins at step 602, where router 4 does not have any local receivers associated with it. Thus, the local_rx_bit is set to false. The flow chart proceeds to step 604, where router 4 waits to receive an OIF update. An OIF update may indicate if a local receiver has been added. After at least one local receiver has been added, a subsequent OIF update may indicate whether any local receiver has been removed. At step 606, router 4 determines, based at least in part on the OIF update, whether it is an RP or RP-Edge. For example, router 4 may determine that it is an RP or RP-Edge if the OIF update indicates that an OIF has been programmed for router 4 to send multicast traffic to a local receiver. If at step 606 router 4 determines that it is not an RP or RP edge, method 600 returns to step 604 to wait to receive another OIF update. If at step 606 router 4 determines that it is an RP or RP edge, the flow chart proceeds to step 608, where router 4 determines if it has any local receivers. If at step 608 the router 4 determines that it does not have any local receivers, and if the local_rx_bit is currently set to false, method 600 returns to step 604 to wait to receive another OIF update. If at step 608 the router 4 determines that it does not have any local receivers, and if the local_rx_bit is currently set to true, method 600 returns to step 602 to set the local_rx_bit to false. If at step 608 the router 4 determines that it has at least one local receiver, and if the local_rx_bit is currently set to false, method 600 proceeds to step 610 to set the local_rx_bit to true, and then returns to step 604 to wait to receive another OIF update. If at step 608 the router 4 determines that it has at least one local receivers, and if the local_rx_bit is currently set to true, method 600 returns to step 604 to wait to receive another OIF update.

In certain embodiments, the RP could also be configured as a replicator. In such embodiments, the method of FIG. 6 may be modified to include a step to check for any remote receivers based on received (S,G) joins. This check may be done by OMP component. As an example, the check may be done in response to determining that the RP/replicator does not have any local receivers. The RP/replicator may be included in the multicast if it has at least one downstream receiver (whether a local receiver or a remote receiver). The RP/replicator may be pruned from the multicast tree if it does not have any downstream receiver (no local receivers and no remote receivers).

Figure 7:
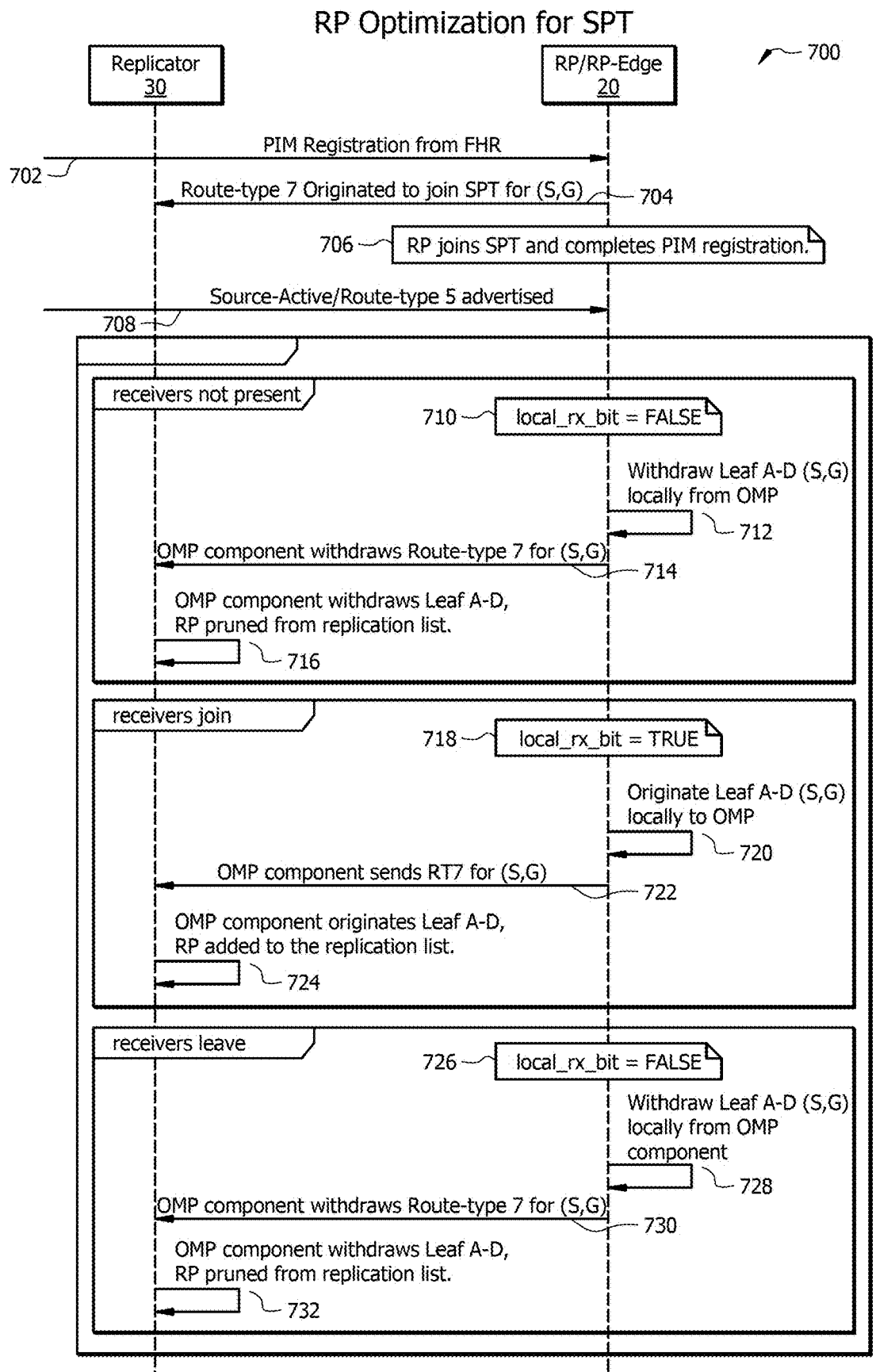
FIG. 7 illustrates an example of a message flow for RP optimization in a shortest-path tree (SPT), in accordance with certain embodiments.

FIG. 7 illustrates an example of a message flow 700 for RP optimization in a shortest-path tree (SPT), in accordance with certain embodiments. Message flow 700 begins with message 702, where RP/RP-Edge 20 receives a PIM registration from an FHR. RP/RP-Edge 20 sends message 704, an RT7 originated to join an SPT for (S, G), to replicator 30. At step 706, RP/RP-Edge 20 joins the SPT and completes PIM registration. Message flow 700 proceeds to message 708, a source-active Route-type 5, RT5, advertisement originated/advertised by an FHR to RP/RP-Edge 20. Message flow 700 may include messages to add or prune RP/RP-Edge 20 from the SPT. For example, messages 710-716 may be used to prune RP/RP-Edge 20 from the SPT in the case where no receivers are present, messages 718-724 may be used to add RP/RP-Edge 20 to the SPT when a first receiver joins, and messages 726-732 may be used to prune RP/RP-Edge 20 from the SPT when a last receiver leaves.

At step 710, the local_rx_bit associated with RP/RP-Edge 20 is set to false, and at step 712, RP/RP-Edge 20 generates a withdraw Leaf A-D (S, G) locally from the OMP component. RP/RP-Edge 20 sends message 714 to replicator 30. In message 714, the OMP component withdraws RT7 for (S, G). At step 716, replicator 30 generates an OMP withdraw Leaf A-D for itself, where RP/RP-Edge 20 is pruned from the replication list.

At step 718, RP/RP-Edge 20 sets the local_rx_bit to true, for example, based on receiving an OIF update. At step 720, RP/RP-Edge 20 generates an originate Leaf A-D (S, G) locally to the OMP component. RP/RP-Edge 20 sends message 722 to replicator 30. In message 722, the OMP component sends RT7 for (S, G). At step 724, replicator 30 generates an originate Leaf A-D, where RP/RP-Edge 20 is added to the replication list.

At step 726, RP/RP-Edge 20 sets the local_rx_bit to false, for example, based on receiving an OIF update indicating that a last receiver has been removed from RP/RP-Edge 20. At step 728, RP/RP-Edge 20 generates a withdraw Leaf A-D (S, G) locally from the OMP component. RP/RP-Edge 20 sends message 730 to replicator 30. In message 730, the OMP component withdraws RT7 for (S, G). At step 732, replicator 30 generates a withdraw Leaf A-D for itself, where RP/RP-Edge 20 is pruned from the replication list.

Figure 8:
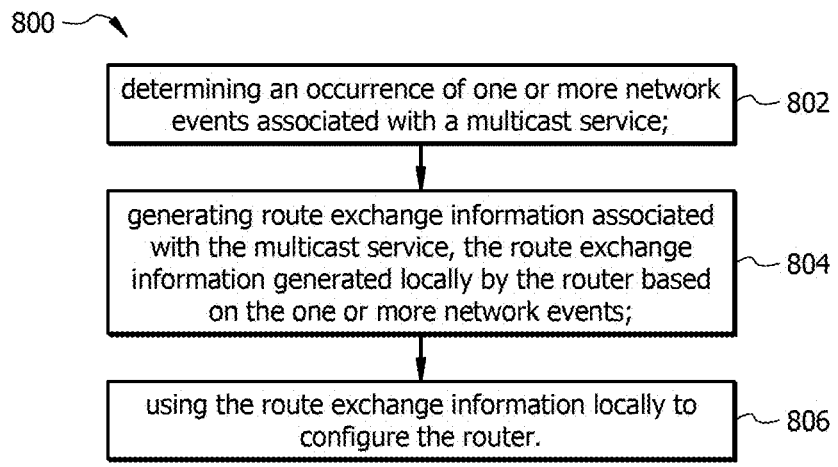
FIG. 8 illustrates an example of a method that may be performed by a router, in accordance with certain embodiments.

FIG. 8 illustrates an example of a method 800 that may be performed by a router 4, in accordance with certain embodiments. The router 4 may be configured as an FHR, an RP, a replicator, or an LHR, depending on the embodiment. Method 800 begins at step 802 with determining an occurrence of one or more network events associated with a multicast service. Examples of network events may include receiving a join message (such as an RT6 join or an RT7 join) via the network, receiving a withdraw message (such as an RT6 withdraw or an RT7 withdraw) via the network, receiving an S-PMSI, receiving an OIF update, and/or other suitable events.

Method 800 proceeds to step 804 with generating route exchange information associated with the multicast service. The route exchange information is generated locally by the router 4 based on the one or more network events determined in step 802. Certain embodiments generate the route exchange information independently of receiving the route exchange information via the network from another node, such as a central entity in the control plane or another router. In certain embodiments, router 4 is configured as an edge router for an SD-WAN, and the router 4 comprises an OMP component configured to generate the route exchange information as a substitute for receiving certain BGP-MVPN route exchange messages. As an example, certain embodiments may locally generate route exchange information analogous to a BGP-MVPN Leaf A-D message based on certain network events (such as receipt of a join message or a withdraw message). In this manner, the BGP-MVPN Leaf A-D need not be communicated via the network.

In certain embodiments, the occurrence of the one or more network events determined at step 802 comprises receiving a join message via the network. The join message requests to join the multicast service. For example, a receiver 6 associated with router 4 may request to join the multicast service if it is interested in receiving the multicast traffic. The receiver 6 associated with router 4 may be directly associated with router 4 or indirectly associated with router 4 (e.g., other routers may be between router 4 and receiver 6). Based at least in part on receiving the join message, the route exchange information generated at step 804 indicates to add a leaf to a multicast tree, such as a Default-MDT, a Shared-MDT, or an SPT. The multicast tree may be a source-specific tree, such as a multicast tree associated with an (S, G) multicast stream. Or, the multicast tree may be non-source-specific, such as a multicast tree associated with an (*, G) multicast stream. The route exchange information indicating to add a leaf to the multicast tree may comprise a Leaf A-D join. In certain embodiments, the leaf added to the multicast tree indicates another node (such as another router or a receiver 6) that has been added to a replication list served by router 4. In certain embodiments, the leaf added to the multicast tree adds router 4 itself to the multicast tree. Before generating route exchange information to add router 4 to the multicast tree, router 4 may verify whether it is already included in the multicast tree (e.g., based on having received a previous join), in which case it might not be necessary to generate route exchange information to add router 4 to the multicast tree.

In certain embodiments, prior to generating the route exchange information in step 804 based on receiving the join message, the operations further comprise determining that the one or more network events determined in step 802 comprise having received an S-PMSI associated with the multicast service. In the case where the S-PMSI is received prior to receiving the join message, router 4 may cache the S-PMSI and may generate the route information that is based on the join message once the join message has been received. In the case where the S-PMSI is received after receiving the join message, router 4 may cache the join message and may generate the route information that is based on the join message once the S-PMSI has been received.

In certain embodiments, the occurrence of the one or more network events determined in step 802 comprises receiving a withdraw message via the network. The withdraw message requests to leave the multicast service. For example, a receiver 6 associated with router 4 may request to leave the multicast service if it is no longer interested in receiving the multicast traffic. Based on receiving the withdraw message, the route exchange information generated in step 804 indicates to remove a leaf from a multicast tree. For example, the route exchange information may comprise a Leaf A-D withdraw. In certain embodiments, the leaf removed from the multicast tree indicates another node (such as another router or a receiver 6) that has been removed from a replication list served by router 4. In certain embodiments, the leaf removed from the multicast tree removes router 4 itself from the multicast tree. Before removing router 4 from the multicast tree, router 4 may verify whether there are any remaining receivers associated with it. Router 4 may abstain from removing itself from the multicast tree until there are no more receivers configured to receive multicast traffic via router 4.

In certain embodiments, router 4 is configured as an RP of the multicast service. The route exchange information generated by the RP at step 804 indicates to include the RP in a multicast tree based on the one or more network events indicating a presence of at least one local receiver associated with the RP. Including the RP in the multicast tree may refer to adding the RP to the multicast tree (e.g., if the RP is not already part of the multicast tree) or keeping the RP in the multicast tree (e.g., if the RP is already part of the multicast tree). The route exchange information generated by the RP at step 804 indicates to prune the RP from the multicast tree based at least in part on the one or more network events indicating an absence of any local receiver associated with the RP, as further explained above with respect to FIGS. 6-7. In certain embodiments, the indication to prune the RP from the multicast tree may be further based on the one or more network events indicating an absence of any remote receiver associated with the RP.

Further examples of locally generating route exchange information (such as Leaf A-D messages) are described above with respect to FIGS. 1-7. Various embodiments of method 800 may generate the route exchange information based on the examples of any of FIGS. 1-7.

Method 800 proceeds to step 806 with using the route exchange information locally to configure router 4. As an example, if the route exchange information indicates to include router 4 in the multicast tree, router 4 may be added to the multicast tree. Router 4 may then receive multicast traffic for one or more multicast flows associated with the multicast tree and may provide the multicast traffic to a next hop of the multicast tree. As another example, if the route exchange information indicates to remove/prune router 4 from the multicast tree, router 4 may be removed from the multicast tree. Router 4 may then stop receiving the multicast tree for the one or more multicast flows associated with the multicast tree. As another example, the route exchange information may indicate a source from which router 4 is to receive the multicast traffic and/or a next hop to which router 4 is to send the multicast traffic.

Figure 9:
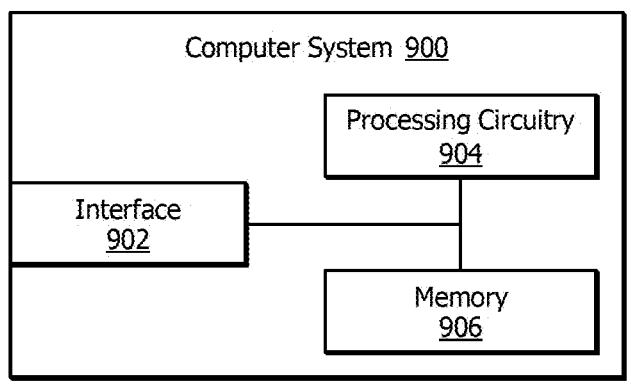
FIG. 9 illustrates an example of a computer system, in accordance with certain embodiments.

FIG. 9 illustrates an example of a computer system 900, in accordance with certain embodiments. A computer system 900 may be used by the systems and methods described herein. As an example, computer system 900 may be used to implement at least a portion of a source 2, a router 4, or a receiver 6. As another example, computer system 900 may be used to implement at least a portion of an edge device, such as an ingress-edge 10, an RP-edge 20, or an egress-edge 40 described above. As another example, computer system 900 may be used to implement at least a portion of replicator, such as replicator 30 described above. In certain embodiments, computer system 900 may include one or more interface(s) 902, processing circuitry 904, memory(ies) 906, and/or other suitable element(s). The interface 902 receives input, sends output, processes the input and/or output, and/or performs other suitable operation. The interface 902 may comprise hardware and/or software.

The processing circuitry 904 performs or manages the operations of the component. The processing circuitry 904 may include hardware and/or software. Examples of a processing circuitry 904 include one or more computers, one or more microprocessors, one or more applications, etc. In certain embodiments, the processing circuitry 904 executes logic (e.g., instructions) to perform actions (e.g., operations), such as generating output from input. The logic executed by the processing circuitry 904 may be encoded in one or more tangible, non-transitory computer readable media. For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

The memory 906 (or memory unit) stores information. The memory 906 may comprise one or more non-transitory, tangible, computer-readable, and/or computer-executable storage media. Examples of the memory 906 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Certain embodiments of the present disclosure may optimize MVPN route exchange, for example, in an SD-WAN environment. In an embodiment, a router (e.g., an edge device) uses internal logic to generate a route exchange message. The internal logic generates the route exchange message based on network events, without requiring a central entity (e.g., vSmart controller) to send the route exchange to the router.

Certain embodiments may facilitate configuring multicast trees in an OMP environment and may optimize the route exchange messages sent via the network, for example, as compared to a BGP environment. For example, certain embodiments do not require the network to send certain route exchange messages or certain bytes within a route exchange message used by BGP, but instead generate route exchange information locally based on other events. Certain embodiments use a state machine to track events, map the events to an analogous BGP route exchange message, and generate a local message that provides the information of a BGP route exchange message without having to send the BGP route exchange message via the network.

As one example, in certain embodiments, an RP may determine whether to be added or pruned from a multicast tree based on events indicating whether there are any local receivers associated with the RP (without the RP having to receive a route exchange message to be added or pruned from the multicast tree). As another example, certain embodiments may suppress certain BGP-MVPN route exchange messages or certain bytes within such messages. Certain embodiments may suppress route type-3 (S-PMSI) messages. For example, the S-PMSI contains a mapping between underlay and overlay addresses. The S-PMSI may not necessarily be needed, for example, in the case where the underlay already has copies of the multicast traffic due to ingress replication. Certain embodiments may suppress route type-4 (Leaf A-D join) messages.

Certain embodiments substitute the suppressed messages by using internal logic to generate required information locally at each edge device (e.g., a router at the edge of the SD-WAN) instead of sending such messages to a controller that would otherwise be responsible for propagating the route exchange messages to each edge device. This results in lesser control plane state and route processing overhead. For example, in the MVPN join/prune multicast protocol exchanges, the transmitting of Leaf A-D route typically requires significant message exchange overhead (one per leaf to the replicator/FHR). Thus, suppressing this message may save significant control plane resources. When a central entity, such as a controller is involved, the benefit of this optimization is magnified as the controller does not need to receive or process the suppressed messages. An advantage of using the BGP-MVPN route exchanges is that the same MVPN infrastructure can be reused for BGP-MVPN (RFC 6514 and BGP 6514) and OMP SD-WAN multicast.

Certain sequences of the present disclosure may be applicable to MVPN ingress replication using BGP for signaling C-multicast routes; at least one replicator node performing replication; and/or immediate switchover from a Shared MDT (or the Default-MDT), where multicast traffic may be destined to a widely distributed set of receivers, to the Data-MDT, where multicast traffic may be destined to interested receivers (without having to send the multicast traffic to routers that are not involved in sending the multicast traffic to the interested receivers).

Although this disclosure describes and illustrates example systems and methods for optimizing MVPN route exchange in SD-WAN environments, this disclosure contemplates any suitable system or method for optimizing MVPN route exchange in SD-WAN environments. Furthermore, although this disclosure describes and illustrates particular components, devices, or systems carrying out particular actions, this disclosure contemplates any suitable combination of any suitable components, devices, or systems carrying out any suitable actions.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

The invention claimed is:

1. A network element, comprising:
one or more processors; and
one or more computer-readable non-transitory storage media, the one or more computer-readable non-transitory storage media comprising instructions that, when executed by the one or more processors, cause one or more components of the network element to perform operations comprising:
determining whether a Selective-Provider Multicast Service Interface (S-PMSI) route is required for a Software-Defined Wide Area Network (SD-WAN) environment;
in response to determining that the S-PMSI route is not required for the SD-WAN environment, dropping, by an Overlay Management Protocol (OMP) component, an S-PMSI message received from a management component;
communicating, after dropping the S-PMSI message received from the management component, a state of an S-PMSI to an OMP component; and
determining, in response to receiving the state of the S-PMSI, that the S-PMSI route is required for the SD-WAN environment.

2. The network element of claim 1, the operations further comprising generating, by the OMP component, a Leaf Auto-Discovery (Leaf A-D) route based on a received join.

3. The network element of claim 2, the operations further comprising generating, by the OMP component, a Leaf A-D removal in the event that one or more network elements withdraw from the join.

4. The network element of claim 3, wherein the one or more network elements comprise a Last Hop Router (LHR).

5. The network element of claim 1, wherein the network element is configured as a rendezvous point (RP) of a multicast service, and wherein route exchange information generated by the RP indicates to:
include the RP in a multicast tree based at least in part on one or more network events indicating a presence of at least one local receiver associated with the RP; and
prune the RP from the multicast tree based at least in part on one or more network events indicating an absence of any local receiver associated with the RP.

6. The network element of claim 1, wherein the network element is configured to locally generate route exchange information independent of receiving the route exchange information from another network element.

7. The network element of claim 1, wherein the OMP component is configured to generate route exchange information as a substitute for receiving a Border Gateway Protocol (BGP) MVPN route exchange message.

8. A method, comprising:
determining whether a Selective-Provider Multicast Service Interface (S-PMSI) route is required for a Software-Defined Wide Area Network (SD-WAN) environment;
in response to determining that the S-PMSI route is not required for the SD-WAN environment, dropping, by an Overlay Management Protocol (OMP) component, an S-PMSI message received from a management component;
communicating, by a network element and after dropping the S-PMSI message received from the management component, a state of an S-PMSI to an OMP component; and
determining, in response to receiving the state of the S-PMSI, that the S-PMSI route is required for the SD-WAN environment.

9. The method of claim 8, further comprising generating, by the OMP component, a Leaf Auto-Discovery (Leaf A-D) route based on a received join.

10. The method of claim 9, further comprising generating, by the OMP component, a Leaf A-D removal in the event that one or more network elements withdraw from the join.

11. The method of claim 10, wherein the one or more network elements comprise a Last Hop Router (LHR).

12. The method of claim 8, wherein the network element is configured as a rendezvous point (RP) of a multicast service, and wherein route exchange information generated by the RP indicates to:

include the RP in a multicast tree based at least in part on one or more network events indicating a presence of at least one local receiver associated with the RP; and prune the RP from the multicast tree based at least in part on one or more network events indicating an absence of any local receiver associated with the RP.

13. The method of claim 8, wherein the network element is configured to locally generate route exchange information independent of receiving the route exchange information from another network element.

14. The method of claim 8, wherein the OMP component is configured to generate route exchange information as a substitute for receiving a Border Gateway Protocol (BGP) MVPN route exchange message.

15. One or more computer-readable non-transitory storage media embodying instructions that, when executed by a processor of a router, cause performance of operations including:

determining whether a Selective-Provider Multicast Service Interface (S-PMSI) route is required for a Software-Defined Wide Area Network (SD-WAN) environment;

in response to determining that the S-PMSI route is not required for the SD-WAN environment, dropping, by an Overlay Management Protocol (OMP) component, an S-PMSI message received from a management component;

communicating, by a network element and after dropping the S-PMSI message received from the management component, a state of an S-PMSI to an OMP component; and determining, in response to receiving the state of the S-PMSI, that the S-PMSI route is required for the SD-WAN environment.

16. The one or more computer-readable non-transitory storage media of claim 15, the operations further comprising generating, by the OMP component, a Leaf Auto-Discovery (Leaf A-D) route based on a received join.

17. The one or more computer-readable non-transitory storage media of claim 16, the operations further comprising generating, by the OMP component, a Leaf A-D removal in the event that one or more network elements withdraw from the join.

18. The one or more computer-readable non-transitory storage media of claim 15, wherein the network element is configured as a rendezvous point (RP) of a multicast service, and wherein route exchange information generated by the RP indicates to:

include the RP in a multicast tree based at least in part on one or more network events indicating a presence of at least one local receiver associated with the RP; and prune the RP from the multicast tree based at least in part on one or more network events indicating an absence of any local receiver associated with the RP.

19. The one or more computer-readable non-transitory storage media of claim 15, wherein the network element is configured to locally generate route exchange information independent of receiving the route exchange information from another network element.

20. The one or more computer-readable non-transitory storage media of claim 15, wherein the OMP component is configured to generate route exchange information as a substitute for receiving a Border Gateway Protocol (BGP) MVPN route exchange message.

* * * * *